April 1, 1969 G. E. PIHL 3,436,752

QUANTIZER

Filed June 19, 1964

Sheet 1 of 2

INVENTOR.
GEORGE E. PIHL
BY
Nicholas A. Pandiscio
ATTORNEY

April 1, 1969 G. E. PIHL 3,436,752
QUANTIZER
Filed June 19, 1964 Sheet 2 of 2

INVENTOR.
GEORGE E. PIHL
BY
Nicholas A. Pandiscio
ATTORNEY

United States Patent Office 3,436,752

Patented Apr. 1, 1969

3,436,752

QUANTIZER

George E. Pihl, Abington, Mass., assignor to Miniature Electronic Components Corp., Holbrook, Mass., a corporation of Massachusetts Filed June 19, 1964, Ser. No. 376,365

Int. Cl. H03k 13/254; H04l 5/00

U.S. Cl. 340—347 20 Claims

ABSTRACT OF THE DISCLOSURE

The specification describes a system for quantizing a varying analog signal in substantially real time. The system comprises a plurality of parallel-connected digitizing circuits which operate at different levels of input signal. Each circuit produces for the level of input signal at which it operates an output signal that is independent of the outputs produced by those digitizing circuits that operate at lower levels of input signal. Each digitizing circuit involves two different reference voltages which differ in value from one circuit to another according to the distribution of quantizing levels.

This invention relates to quantization and more particularly to new and improved electrical apparatus for quantizing a varying analog signal.

Quantization or quantizing is a process of digitizing an analog information record by dividing a range of values of said record into a finite number of smaller sub-ranges, each of which is represented by an assigned or quantized value within the sub-range. The information record may be continuous or intermittent, and, depending upon the system, the quantizing may involve continuous or random reading of the information record or may involve sampling the information record at fixed intervals of time. The advantage in quantizing an analog information signal is that it yields a digital form of record which can be manipulated electronically with greater facility and simplicity than an analog record. Quantization has facilitated application of digital techniques of data control for computation, documentation, storage and readout of diverse analog variables such as acceleration, altitude, capacitance, current, energy, fluid flow, light intensity, mass, pressure, temperature, velocity, voltage, and volume. Some analog-digital systems are especially useful in handling quasistatic variables such as mass or capacitance (upon automatic or operator command) while other systems are designed to handle dynamic data such as acceleration. In each case, however, the accuracy of the value measuring portion of the system is dependent upon the accuracy of the quantizer.

The object of the present invention is to provide a new and improved quantizer which is adapted to digitize both quasistatic and dynamic analog data.

A further object is to provide a means for quantizing or digitizing an input analog signal into a digital output having as many quantizing levels as desired with a response time which is limited only by the activation time of diodes, transistors, etc., and is not dependent upon clock rates or require up and down scaling as in the case of prior art devices.

Still another object of the invention is to provide a quantizer having an adjustable input triggering threshold and an independently adjustable output for each level of quantizing.

Another important object of the invention is to provide a quantizer which can be adapted to remember (a) the quantized value of the input signal at the time the signal is removed or (b) the quantized peak value of the input signal. In the latter case, the quantizer makes possible an instantaneous peak voltmeter.

Other objects and advantages of the present invention will become more readily apparent when reference is had to the following detailed specification which is to be considered together with the accompanying drawings wherein.

Figure 1:
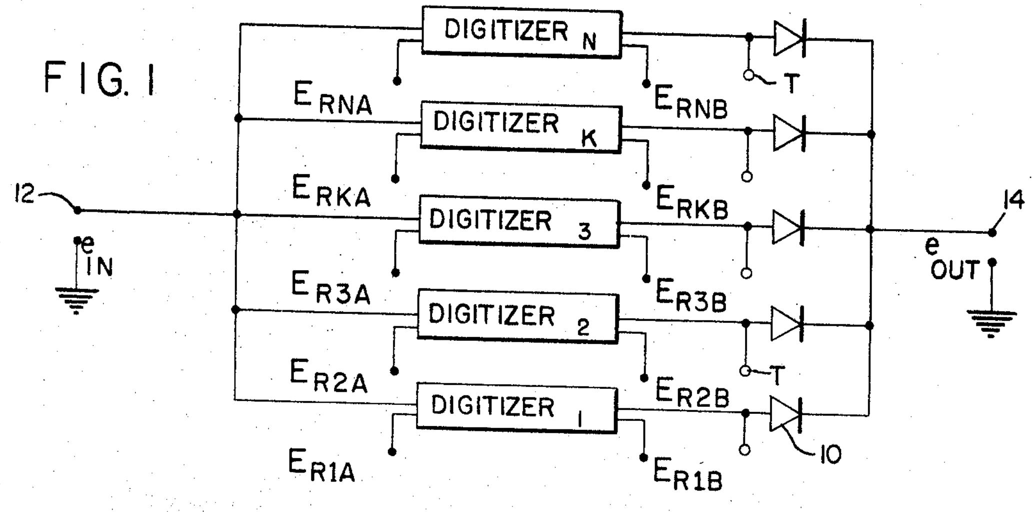
FIG. 1 is a schematic representation of a quantizer embodying the present invention.

Turning now to FIG. 1, the quantizer illustrated therein comprises N digitizer circuits where N can be any number K depending upon the number of digitized levels desired. On its output side, each digitizer circuit is connected in series with a separate switching diode 10. All of the digitizing circuits and their respective diodes are connected in parallel between a common input terminal 12 and a common output terminal 14. The input analog voltage $e_{in}$ applied at terminal 12 and the voltage $e_{out}$ developed at terminal 14 are evaluated with respect to a common reference potential, e.g., ground.

Each digitizer circuit is permanently supplied with two precision reference voltages $E_{RKA}$ and $E_{RKB}$ associated with its input and output sides respectively. Additionally, each digitizer also has the property of producing an output voltage equal to its $E_{RKB}$ reference voltage when its input exceeds its $E_{RKA}$ reference voltage. The $E_{RKB}$ reference voltages for the different digitizers are chosen for the discrete digitized levels desired, while the $E_{RKA}$ reference voltages are chosen to lie between such levels at the desired switching points. As $e_{in}$ varies, it causes all digitizers having an $E_{RKA}$ below the instantaneous value of $e_{in}$ to produce output voltages. Because of the manner in which these output voltages are coupled together through the switching diodes 10, the output of the highest order digitizer that is activated functions to back bias the switching diodes associated with the lower order digitizers so that the output of the latter are prevented from appearing at terminal 14. Hence, the output voltage of the highest order digitizer that has been activated by $e_{in}$ is present as $e_{out}$.

The following example illustrates a typical application of the quantizer of FIG. 1. Let it be assumed that it is desired to digitize an input analog voltage varying from zero to plus ten volts into ten steps of one volt each with the switching occurring at the one-half volt points. In such a case, the quantizer would comprise ten digitizing circuits and positive reference voltages would be supplied as follows:

| K | $E_{RKA}$ | $E_{RKB}$ |
|---|---|---|
| 1 | 0.5 | 1.0 |
| 2 | 1.5 | 2.0 |
| 3 | 2.5 | 3.0 |
| 4 | 3.5 | 4.0 |
| 5 | 4.5 | 5.0 |
| 6 | 5.5 | 6.0 |
| 7 | 6.5 | 7.0 |
| 8 | 7.5 | 8.0 |
| 9 | 8.5 | 9.0 |
| 10 | 9.5 | 10.0 |

In accordance with the mode of operation previously described, as $e_{in}$ varies between 0 and 10 volts, each digitizer having an $E_{RKA}$ below the instantaneous value of $e_{in}$ will produce an output voltage equal to its $E_{RKB}$ reference voltage. Thus, if $e_{in}$ instantaneously is between 9.5 and 10 volts, each of the ten digitizers will produce an output voltage with the digitizer having $K=1$ yielding an output of 1.0 volts and the other digitizers having $K=2$, 3, 4, etc., yielding successively larger outputs differing by increments of 1 volt. However, because of the switching diodes 10, only the largest digitizer output will appear as $e_{out}$. Hence, $e_{out}$ will be 10.0 volts. If subsequently the analog voltage changes to some lower value, $e_{out}$ would change to a lower digitized value, e.g., an input analog voltage of 6.2 volts would yield an $e_{out}$ value of 6.0 volts. It is believed to be obvious that the reference voltages can be chosen for any nonlinear or linear type of digitizing and also that the triggering points can be chosen independently of one another. However, the difference in magnitude between the outputs for two immediately successive levels of digitizing should be sufficient to permit the upper level output to render non-conductive the switching diode for the lower level, whereby the lower level output is blocked from appearing as $e_{out}$.

The digitizer circuits may take various forms. A preferred form is the one shown in FIG. 2 which comprises two NPN transistors 18 and 20. The varying analog signal $e_{in}$ (of positive polarity relative to ground) is applied to the base of transistor 18 by way of a suitable resistor 22. A positive D.C. reference voltage $E_{RKA}$ is applied directly to the emitter of transistor 18 while its collector is made positive relative to its emitter by connection via a resistor 24 to a voltage supply 26 which is positive with respect to ground. The junction of the collector of transistor 18 and resistor 24 is connected in series with two additional resistors 28 and 30 and a voltage supply 32 which is negative with respect to ground. The base electrode of transistor 20 is coupled to the collector of transistor 18 by connection to the junction of resistors 28 and 30. The emitter of transistor 20 is connected directly to ground while its collector is made positive relative to its emitter by connection to the source of a positive reference voltage $E_{RKA}$ through a resistor 34 of suitable value. The output of the digitizer circuit is taken between the collector of transistor 20 and ground. This output is applied to the switching diode 10 (FIG. 1) associated with the digitizer.

Figures 2, 4:
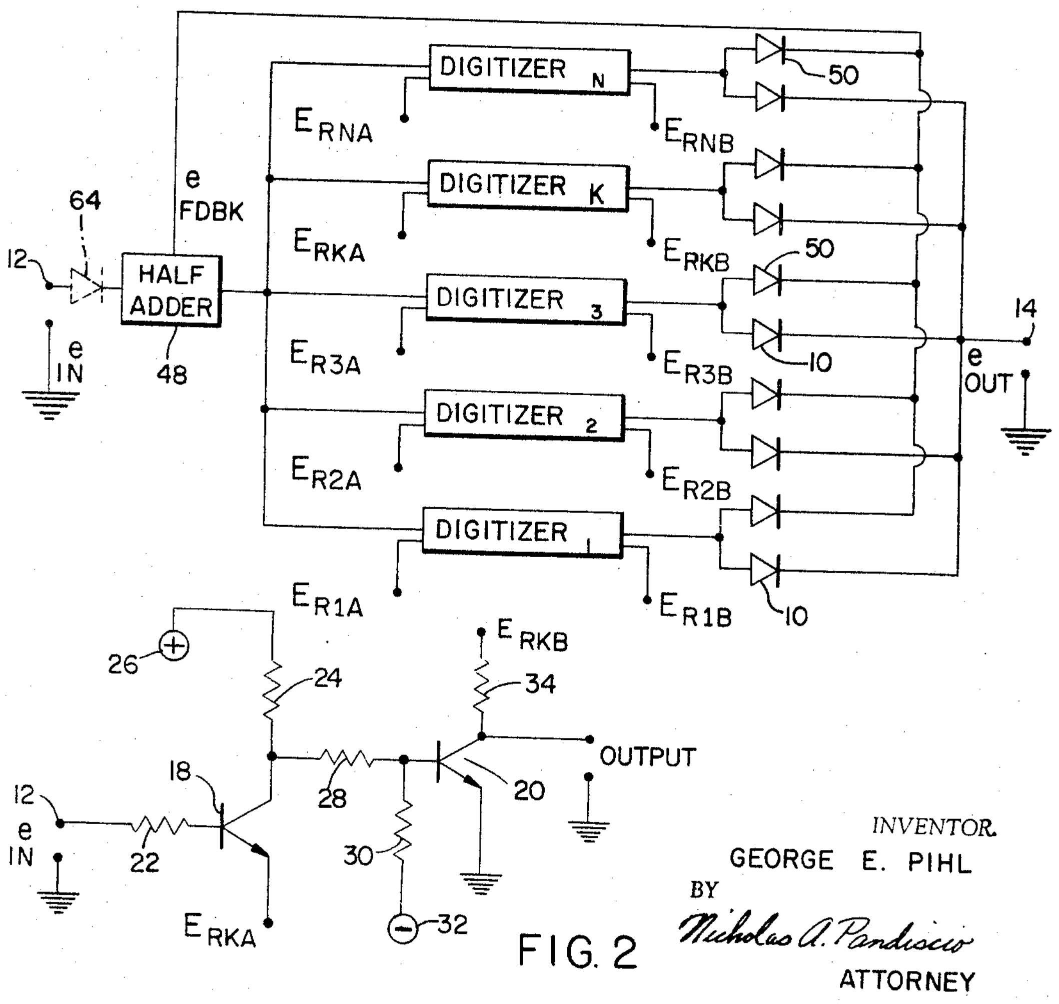
FIG. 2 is a schematic representation of a preferred form of digitizer circuit which may be embodied in quantizers of the present invention.
FIG. 4 is a schematic representation of the quantizer of FIG. 1 modified to provide memory or "read and hold" characteristics.

Operation of the digitizer circuit of FIG. 2 is as follows: If $e_{in}$ is less than $E_{RKA}$, transistor 18 is non-conducting and the high positive voltage at its collector maintains transistor 20 in a highly conducting state such that its output voltage is substantially zero. As $e_{in}$ exceeds $E_{RKA}$, transistor 18 becomes highly conductive, causing transistor 20 to be cut off and its collector voltage to increase to the $E_{RKB}$ level. By properly adjusting the values of the various resistors and the various supply voltages, it is possible to reduce any difference errors between $E_{RKA}$ and the switching point and between $E_{RKB}$ and the output voltage to values which permit accurate performance within the operating limits determined by the maximum variations of the analog input and the number of digitizing levels embodied in the quantizer. It is to be understood that the circuit of FIG. 2 is disclosed by way of example only and that it may be modified or replaced by other circuits capable of performing the same digitizing function.

The quantizer of FIG. 1 may be used in various devices and for various purposes, as, for example, a device for classifying objects according to discrete weight classifications. The input analog voltage $e_{in}$ could be obtained from a suitable weight-responsive transducer such as a strain gage transducer, while the reference voltages $E_{RKA}$ and $E_{RKB}$ would be chosen to define the limits of the various weight classifications. The quantizer then would function to decide into which weight classification each successively weighed object falls. A voltmeter connected to read $e_{out}$ at quantizer terminal 14 could be utilized to provide an indication of the particular weight classifications for each object. Since the output $e_{out}$ will vary in discrete steps, the voltmeter need only be accurate enough to indicate the sharp step differences. On the other hand, the classification itself would be quite reliable since its accuracy is a function only of the accuracy of the individual digitizer circuits. For this reason, it is not necessary that a meter be used as an indicator of the quantized weights. Instead, some other form of visual indicator could be used to indicate the output voltage in digital fashion. Thus, for example, the alternate form of visual indicator could employ a plurality of indicator lamps, each of which would be energized at a different quantized value and when energized would illuminate a digital marking of different quantized value. Such a visual indicator is shown in FIG. 3.

Figure 3:
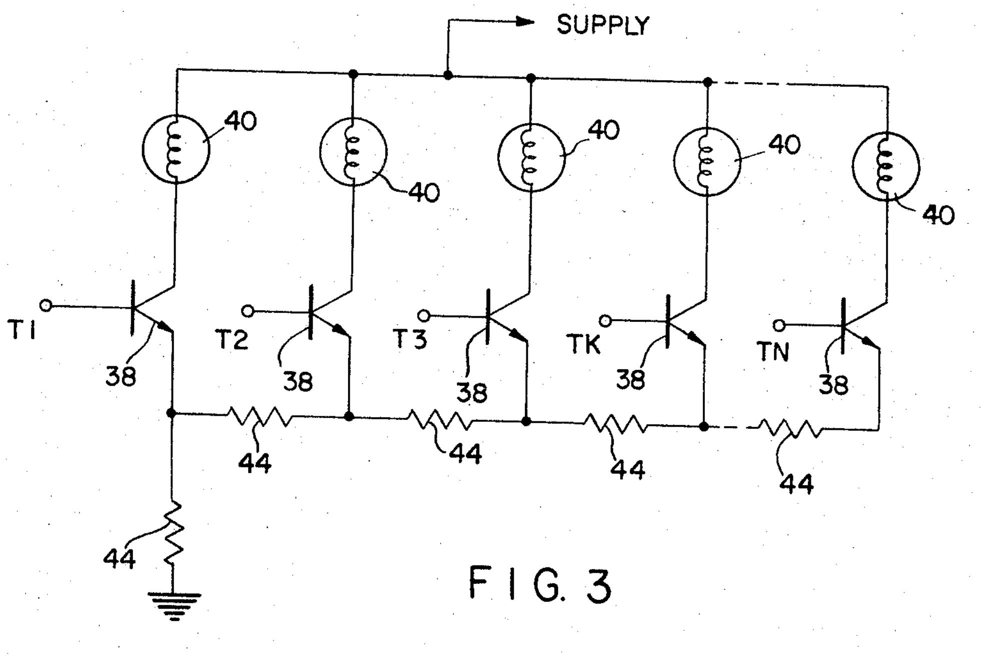
FIG. 3 illustrates one form of visual indicator which may be used with the quantizer of FIG. 1 to indicate the actual quantized value of the input signal.

The system of FIG. 3 comprises a plurality of NPN transistors 38 equal in number to the number of digitizers embodied in the quantizer (FIG. 1). A positive supply voltage is applied to the collectors of all of the transistors 38 via like indicating lamps 40 while the separate outputs of the quantizing circuits are applied to their base electrodes. In this connection, it is to be noted that in employing the indicator of FIG. 3 with the quantizer of FIG. 1, it is not necessary for the quantizer to embody the switching diodes 10. For this reason, and to avoid the use of another figure in the drawings, the quantizer of FIG. 1 is shown as provided with auxiliary output terminals T in advance of switching diodes 10. Connecting the bases of transistors 38 to different ones of the terminals T effectively ties each of said transistors to a different digitizing circuit. The order of the digitizing circuits to which transistors 38 are connected is indicated in FIG. 3 by the designations T1 . . . TN, where T1 is the lowest quantizing level and TN is the highest quantizing level. The emitters of transistors 38 are connected to successive taps in a series resistor network made up of N resistors 44, with one end of the resistor network connected to ground and the other end connected to the emitter of the transistor associated with the highest order digitizer ($K=N$). The resistors 44 are all equal with a value approximately the same as the step change in quantized level going from one level to the next, divided by the desired lamp current.

Operation of the circuit of FIG. 3 is straightforward. In the absence of any input signal derived from the quantizer, each transistor 38 is non-conducting. As the lowest order digitizer is activated, its output causes the corresponding transistor 38 to conduct, whereupon the lamp 40 associated therewith is illuminated. As each successively higher level digitizer is activated, the corresponding lamp 40 is activated. At the same time, because of the manner in which the emitters are connected, a negative biasing effect is produced which extinguishes the next lower lamp. Thus, only one lamp at a time is energized despite the fact that more than one digitizing circuit of the quantizer is activated. The lamp which is energized at any instant is the one corresponding to the actual quantized value of the signal. Visual indication is effected by positioning the several lamps so that each one when energized will illuminate a digital marking representative of a different quantized value.

It is recognized that the quantizer of FIG. 1 is adaptable to a number of modifications. One contemplated modification is to quantize the input analog signal into large amplitude levels in a decade arrangement, with any voltage in excess of $E_{RKA}$ but insufficient to trigger the next level being applied to a second quantizer whose levels are $\frac{1}{10}$ those of the first quantizer. This process makes it possible to produce a quantized output having many levels using comparatively few components, as well as facilitating conversion to some form of binary coded output.

Figure 5:
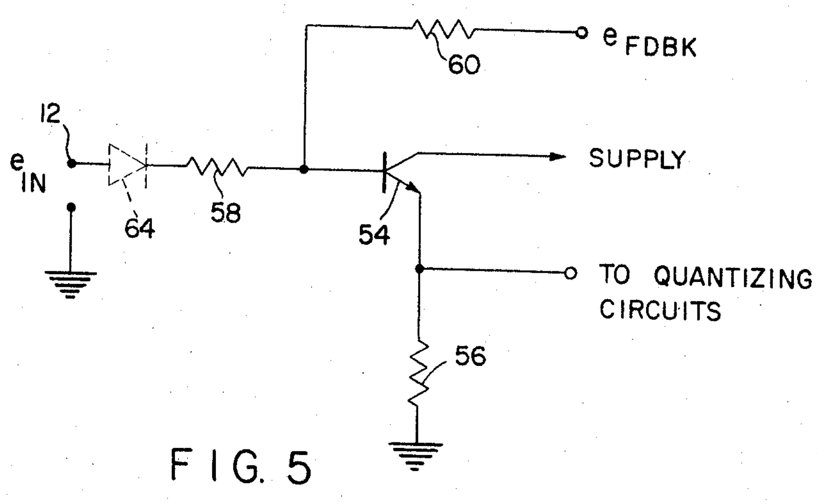
FIG. 5 is a schematic representation of a half adder which can be used in the quantizer of FIG. 4 to provide read and hold characteristics.

A further modification is to provide the quantizer with memory so as to store and hold the quantized value of the input analog signal. Such a modification has utility whenever it is desired to remember the value of $e_{in}$ after it has ceased to exist. Thus, in the case of a system for classifying according to weights, the object being weighed, e.g., a rolling freight car, might be traveling too fast for real time observation. Providing a memory system for the quantizer enables the indicator, lights, meter, etc., to retain its reading after the object has passed. FIGS. 4 and 5 show a quantizer provided with memory means according to the present invention.

The system of FIG. 4 is fundamentally the same as the system of FIG. 1 except for the addition of a half adder 48 and a plurality of parallel feedback circuits, one for each digitizer. The half adder is interposed between the analog input terminal 12 and the digitizing circuits K. Each feedback circuit comprises a switching diode 50 connected between the output side of the digitizer with which it is associated and the half adder. The diodes 50 function like the diodes 10, with the output of the highest order digitizer which is activated back-biasing the diode of the lower order digitizers so that only the output of the highest activated digitizer is fed back to the half adder. In other words, the feedback voltage $e_{FDBK}$ is equal to the quantized output voltage $e_{out}$. The feedback voltage is combined with the input voltage $e_{in}$ in the half adder. The latter produces an output which (a) equals one-half the sum of $e_{in}$ and $e_{out}$ when $e_{in}$ is present and (b) equals the total value of $e_{FDBK}$ when $e_{in}$ is disconnected. Hence, if the input signal is removed, the system will remain locked in at the quantized level (represented by $e_{FDBK}$) that existed at the time the input signal was removed.

FIG. 5 shows a half adder which will perform as described above. The illustrated half adder comprises an NPN transistor 54 whose emitter is connected to ground via a suitable resistor 56 and whose collector is connected to a suitable positive supply voltage. The base is connected by a suitable resistor 58 to the analog signal input terminal 12. The positive feedback voltage $e_{FDBK}$ from the quantizer is coupled to the base by way of a resistor 60 and the output for the quantizer is taken between the emitter and ground. The resistors 58 and 60 are equal in value. Transistor 54 conducts with or without $e_{in}$ so long as $e_{FDBK}$ is present. Although $e_{FDBK}$ will not always equal $e_{in}$ but may be larger or smaller, one-half the sum of the feedback voltage $e_{FDBK}$ produced by the highest activated digitizer and the analog signal $e_{in}$ will always be less than the $E_{RKA}$ voltage of the next higher order digitizer and will always be at least equal to the $E_{RKA}$ voltage of the digitizer producing $e_{FDBK}$. Hence, the sum of $e_{in}$ and $e_{FDBK}$ will maintain the quantized level reflected by $e_{FDBK}$.

The memory feature just described renders the quantizer of FIG. 4 useful as a digital voltmeter in that an analog voltage can be sampled for a very short time to determine its value at a particular instant. The quantizer will hold the quantized value at that particular instant for visual determination after the sampling period has passed. The visual determination may be effected by a conventional meter or by some other suitable form of visual indicator, such as one embodying the system of FIG. 3.

The quantizer of FIG. 4 also makes possible peak reading of the input analog signal so as to yield a very practical instantaneous peak voltmeter. Conversion to peak reading is achieved by adding a diode 64 (shown in phantom in FIGS. 4 and 5) between the analog input terminal 12 and half adder 48. Diode 64 functions as a switch to automatically disconnect the input voltage at the peak of any input cycle, resulting in a fixed output voltage $e_{out}$ at the quantized peak value. This disconnection is effected by virtue of diode 64 being back biased by $e_{FDBK}$.

Obviously, many modifications and variations of the present invention are possible in the light of the above teachings. It is to be understood, therefore, that the invention is not limited in its application to the details of construction and arrangement of parts specifically described or illustrated, and that within the scope of the appended claims, it may be practiced otherwise than as specifically described or illustrated.

What is claimed is:

1. A quantizer comprising a plurality of digitizing circuits connected to a common input terminal so that each will receive the same analog input signal, each digitizing circuit being supplied with first and second reference voltages differing from each other by a predetermined increment and being adapted to produce an output voltage determined by said second reference voltage only in response to an input voltage exceeding a level determined by said reference voltage, the output voltage and the first and second reference voltages of each digitizing circuit differing from the output voltage and the first and second reference voltages respectively of each other digitizing circuit by predetermined increments whereby said quantizer provides as many quantizing levels as there are digitizing circuits.

2. A quantizer as defined in claim 1 further including means for selecting as the output of said quantizer the largest of said different output voltages.

3. A quantizer as defined by claim 1 wherein the difference between said first and second reference voltages is the same for each digitizing circuit.

4. A quantizer comprising a plurality of digitizing circuits each supplied with first and second reference voltages and adapted to produce an output voltage determined by said second reference voltage only in response to an input voltage exceeding said first reference voltage, the output voltage for each digitizing circuit having a greater value than the said first reference voltage.

5. A quantizer as defined by claim 4 wherein each digitizing circuit produces a different output voltage, and further including means for selecting as the output of said quantizer the largest of said different output voltages.

6. A quantizer as defined by claim 5 wherein said digitizing circuits include feedback means for storing and holding said largest output voltage after said input voltage has been terminated.

7. A quantizer as defined by claim 5 further including means for holding its output at the quantized value of the peak input voltage.

8. A quantizer as defined by claim 7 wherein said last mentioned means comprises a switch operative to automatically disconnect said circuits from said input voltage at its peak value.

9. A quantizer as defined by claim 4 further including means coupled to each of said digitizing circuits for indicating the largest output voltage produced by said digitizing circuits.

10. Apparatus for quantizing an analog electrical signal comprising a plurality of digitizer circuits each supplied with first and second reference voltages with said first reference voltages differing by predetermined increments and said second reference voltages differing by like increments but having values occurring between said first reference voltages, means for applying an analog signal as an input to all of said digitizers simultaneously, each digitizer having means for triggering said each digitizer when said input signal exceeds its said first reference voltage, and means for deriving from each digitizer when triggered an output voltage equal to its said second reference voltage.

11. Apparatus as defined by claim 10 further including an output terminal, and means for applying to said output terminal only the largest output voltage of the output voltages produced simultaneously by all of said digitizing circuits.

12. Apparatus as defined by claim 11 further including means for holding at said output terminal the said largest output voltage present at said output terminal when said analog input signal is removed.

13. Apparatus as defined by claim 11 further including means for disconnecting said digitizing circuits from said analog input signal when said signal drops below its peak value, whereby the output voltage present at said output terminal is the peak quantized value of said input voltage.

14. A quantizer comprising an input terminal to which a varying analog signal may be applied, an output terminal, and a plurality of like digitizing channels connected in parallel between said terminals, each channel comprising a digitizing circuit and a diode, each of said digitizing circuits adapted to be triggered by said analog signal at a different value thereof and to produce an output signal differing from the output signals of the other digitizing circuits by predetermined increments, said diodes adapted to block from said output terminal all but the largest of said output signals generated simultaneously by said digitizing circuits.

15. A quantizer comprising an input terminal to which a varying analog signal voltage may be applied and a plurality of like digitizing circuits each connected to said input terminal, each digitizing circuit being supplied with first and second reference voltages with said second reference voltage exceeding said first reference voltage, said first reference voltages differing by predetermined increments and said second reference voltages also differing by predetermined increments but having values occurring between the values of said first reference voltages, each digitizer comprising (a) first means adapted to be triggered when said input terminal has applied thereto an analog signal voltage that exceeds a first predetermined value determined by said first reference voltage, and (b) second means for producing in response to triggering of said first means an output voltage having a second predetermined value that is determined by said second reference voltage and exceeds said first predetermined value, the output voltage of each digitizing circuit differing from the output voltages of the other digitizing circuits by different predetermined amounts, whereby each circuit determines a different quantizing level.

16. A quantizer as defined by claim 15 further including a common output terminal connected to said digitizing circuits, and means for applying to said common output terminal only the largest of the output voltages produced by said digitizing circuits in response to the same analog signal voltage applied to said input terminal.

17. A quantizer as defined by claim 16 wherein said last mentioned means includes a plurality of switching devices each connected between one of said digitizing circuits and said output terminal, said switching devices all being interconnected so that any given one of said switching devices will fail to close if the output voltage of the digitizing circuit to which it is connected is smaller than the output voltage provided by any of the other digitizing circuits.

18. A quantizer as defined by claim 16 further including an indicator having a plurality of energizeable means each adapted to produce an indication when energized by the output voltage of one of said digitizing circuits, means for applying the output voltage of each digitizing circuit to one of said energizeable means, and means for preventing energization of all of said energizeable means except the one to which is applied the largest of said output voltages.

19. A quantizer as defined by claim 15 wherein said first and second means comprise first and second threshold switching devices respectively, said first reference voltage being applied to said first switching device and said second reference voltage being applied to said second switching device, said first switching device being connected between said input terminal and said second switching device, said first switching device being adapted to undergo switching and produce an output signal when said analog signal voltage exceeds said first predetermined value, said second switching device being connected to said second reference voltage and being adapted to undergo switching and produce said output voltage in response to the said output signal of said first switching device.

20. A quantizer as defined by claim 15 further including a half adder interposed between said input terminal and said digitizing circuits, a common output terminal connected to said digitizing circuits, means for applying to said common output terminal only the largest of the output voltages produced by said digitizing circuits in response to the same analog signal applied to said input terminal, and means for feeding back to said half adder said largest output voltage, said half adder providing to said digitizing circuits an input signal at a level sufficient to maintain at said output terminal the largest output voltage present at said output terminal when said analog signal voltage is removed from said input terminal.

References Cited

UNITED STATES PATENTS

| | | | |
|---|---|---|---|
| 2,612,550 | 9/1952 | Jacobi | 340—347 |
| 2,869,079 | 1/1959 | Staffin et al. | 340—347 |
| 2,924,711 | 2/1960 | Kretzmer | 340—347 |
| 3,050,713 | 8/1962 | Harmon | 340—347 |
| 3,072,332 | 1/1963 | Margopoulos | 340—347 |
| 3,167,757 | 1/1965 | D'Aguila | 340—347 |

MAYNARD R. WILBUR, *Primary Examiner.*

W. J. KOPACZ, *Assistant Examiner.*